Patented Sept. 4, 1923.

1,467,275

UNITED STATES PATENT OFFICE.

JOSEPH KOERNER, OF COBURG, GERMANY.

PROCESS OF DECOMPOSING ZIRCONIUM AND SIMILAR ORES.

No Drawing.  Application filed March 15, 1923. Serial No. 625,273.

*To all whom it may concern:*

Be it known that I, JOSEPH KOERNER, a citizen of Germany, and a resident of Coburg, Germany, have invented a new and useful Improvement in Processes of Decomposing Zirconium and Similar Ores, of which the following is a specification.

This invention relates to the treatment of ores, and particularly to a process of separating or extracting the metals or oxides belonging to the class of so-called rare earths, such as zirconium, titanium, and cerium, from their ores, the present invention dealing especially with the natural ores of zirconium.

Zirconium oxide and other compounds of zirconium find extensive use in the enamelling industries, in which such compounds must be in a substantially pure condition. Many of the prior processes for purifying the ores of such metals have been unsatisfactory, and numerous attempts to provide a practical commercial process for producing them have been made, but have proved unsuccessful, principally because of the fact that either large quantities of expensive solvents and fluxing materials were necessary, or exceedingly high temperatures had to be employed for carrying them out.

Some methods now in use render the mineral more soluble by fusing with either caustics, sodium or potassium carbonate, or lime, but such processes usually require large quantities of auxiliary fluxing materials and extremely high temperatures, often white heat, rendering the same uneconomical.

The object of the present invention is to provide a practical commercial process which can be easily and economically practiced, and which can be carried out at a comparatively low temperature.

According to the present process a smelt is made of the rare earth mineral ore, using fluorides of silicon as the dissolving or fluxing medium, the process being carried out at but a comparatively low temperature.

The present method is practicable for the decomposition of clays and kaolines, mica and all minerals forming oxides of the type $R_2O_3$. By means of the fluxing materials employed till now, the perfect chemical disintegration of those rocks and minerals has been difficult or impossible. For example one cannot decompose them by means of an aqueous solution of fluorides of silicon, as had been proposed for the production of alkali compounds soluble in water from substances not soluble in this medium.

As a specific example, the method of treating zirconium ore will be given. One part of pulverized baddeleyite, a natural ore of zirconium, is first intimately mixed with one and one-half to two parts of silicofluoride of sodium, and this mixture heated in a fire-clay crucible until the reaction is completed which may be readily determined due to the stoppage of the formation and escape of gases. This will be apparent due to the absence of bubbles, and is a convenient means of determining the end of the necessary reaction. The smelt is poured into water, subsequently powdered, and treated with a boiling solution of sulfuric acid, such acid solution being composed of one part of concentrated sulfuric acid and two parts of water. The silicic acid precipitates while the remaining portion of silicon escapes in combination with available fluorine in the form of fluoride of silicon, leaving a concentrated solution of sulfate of zirconium. The sulfate of the metal is then converted in any of the well known ways to the oxide or hydroxide.

Ores of the character named usually contain some impurities in the nature of compounds of iron. With the smelting process defined, substantially all of the iron escapes as fluoride of iron, resulting in an almost absolutely pure product. This is a decided advantage in the actual commercial practice of the invention.

Although the invention has been particularly described in connection with baddeleyite for the production of zirconium, the same can be successfully carried out with similar ores of zirconium and analogous ores of the other metals belonging to the class of rare earths, for instance with monazite and other similar ores of cerium.

I claim:

1. The process of purifying or extracting metal oxides from the ores of the class of rare earths which consists in fusing the ore with a fluoride of silicon.

2. The process of purifying or extracting metal oxides from the ores of the class of rare earths which consists in fusing the ore with a fluoride of silicon, pouring the smelt into water, and treating the product obtained with concentrated sulfuric acid whereby to produce the sulfate of the metal.

3. The process of extracting zirconium oxide from its ores which consists in forming a smelt of the ore with a fluoride of silicon, pouring the smelt into water, powdering and treating the product obtained with concentrated sulfuric acid whereby to obtain the sulfate of the metal.

4. The process of extracting zirconium oxide from its ores which consists in fusing the ore with a fluoride of silicon until bubbles of gas are formed in the smelt, and subsequently treating the smelt with well known reagents to obtain the desired compound of the metal.

5. The process of extracting zirconium oxide from its ores which consists in forming a smelt of baddeleyite and a fluoride of silicon, and subsequently treating the smelt with well known reagents to obtain the desired compound of the metal.

6. The process of extracting zirconium oxide from its ores which consists in forming a smelt of one part of baddeleyite and one and one-half to two parts of a fluoride of silicon, pouring the smelt into water, and treating the pulverized resultant product with concentrated sulfuric acid whereby to obtain the sulfate of the metal.

7. The process of extracting zirconium oxide from its ores which consists in fusing a mixture of one part of baddeleyite and one and one-half to two parts of a fluoride of silicon until the reaction is completed, pouring the smelt into water, pulverizing and treating the resultant product with concentrated sulfuric acid to obtain the sulfate of the metal, and subsequently converting the sulfate into the oxide or hydroxide.

In testimony whereof I sign my name.

JOSEPH KOERNER.